May 25, 1926.

E. S. ANDERSON

RAKE

Filed Feb. 2, 1924

1,585,958

E. S. Anderson,
Inventor

By C. A. Snow & Co.
Attorneys

Patented May 25, 1926.

1,585,958

UNITED STATES PATENT OFFICE.

EDWARD S. ANDERSON, OF MABEL, MINNESOTA.

RAKE.

Application filed February 2, 1924. Serial No. 690,260.

This invention relates to a rake of that type designed for use on lawns and gardens.

One of the objects of the invention is to provide an ordinary rake with an attachment whereby accumulations of grass, leaves and the like can be stripped from the tines or teeth of the rake with little effort on the part of the user.

A further object is to provide a means for supporting the head of the rake at a desired elevation above the surface of the ground thereby to guide the teeth lightly over the lawn or other surface being raked.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Referring to the figures by characters of reference 1 designates the head of a rake of any suitable construction, the same being provided with a series of teeth 2 such as ordinarily used and a handle 3 is extended from the center of the head.

Figure 1:
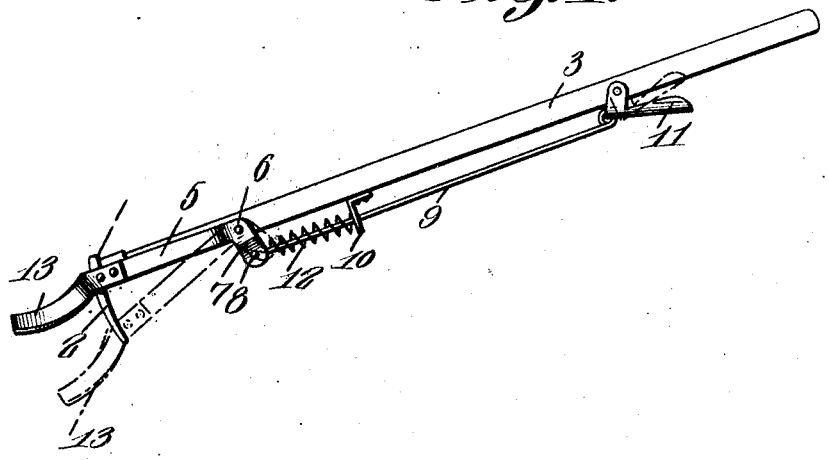
Figure 1 is a side elevation of a rake having the present improvements combined therewith, the attachment being shown in two positions by full and broken lines respectively.
Figure 2:
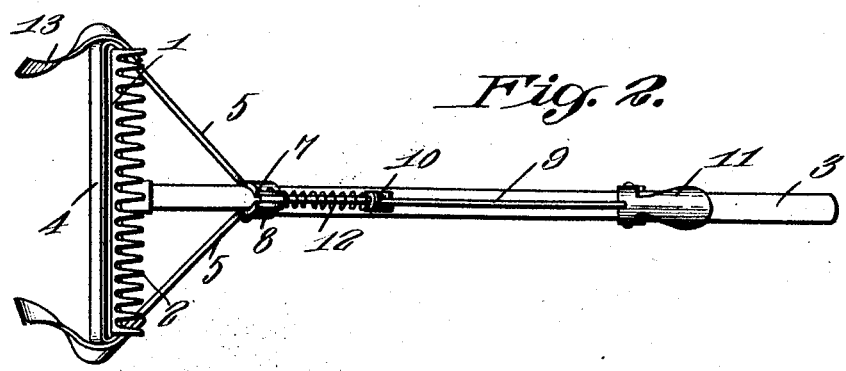
Fig. 2 is a bottom plan view of the device.
Figure 3:
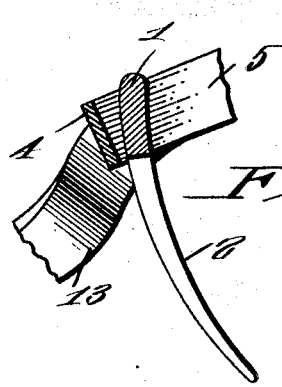
Fig. 3 is an enlarged section through the head of the rake and the adjoining portion of the attachment.

The attachment constituting the present invention includes a stripping blade 4 slightly longer than the head 1 of the rake and extending from the ends of this blade are arms 5 that converge toward the handle. These arms are mounted to swing upon a pivot pin 6 extending into the handle and each arm has a downwardly extending finger 7 at its free end. These fingers are pivotally connected at 8 to one end of an operating rod 9 projecting between the fingers and sliding within a bracket 10 secured to the handle 3. A hand lever 11 is pivotally mounted on the handle near the free end thereof and is engaged by one end of the rod 9 as shown. A spring 12 is mounted on the rod between bracket 10 and the fingers 7 and serves to press said fingers forwardly so as to yieldingly support the blade 4 in the position shown in Fig. 3 and by full lines in Fig. 1.

Secured to the arms 5 are downwardly and rearwardly extending runners or guides 13. These are normally supported by the blade 4 out of contact with the surface engaged by the teeth 2.

A rake having this attachment applied to it is to be used in the ordinary manner. When it is desired to clean the teeth of the rack by stripping trash therefrom, it becomes merely necessary to draw the hand lever 11 toward the handle 3. This will result in contraction of spring 12 and the arms 5 will swing the blade 4 downwardly. Consequently any trash adhering to the teeth 2 will be forced therefrom by the blade. As soon as the handle 11 is released the spring 12 will return the blade to its normal or raised position.

By shifting the lever 11 out of its normal position the runners or guides 3 can be swung downwardly so as to partly or entirely elevate the teeth 2 from contact with the surfaces raked.

What is claimed is:—

The combination with the toothed head and handle of a rake, of runners mounted to move relative to the head and handle, means for producing relative movement of the runners and head for bringing the runners into contact with the ground and elevating the head, and means fixed relative to the runners for stripping material from the toothed head during the elevation of the head.

In testimony that I claim the foregoing as my own, I have hereto affixed my signature.

EDWARD S. ANDERSON.